Figure 1:
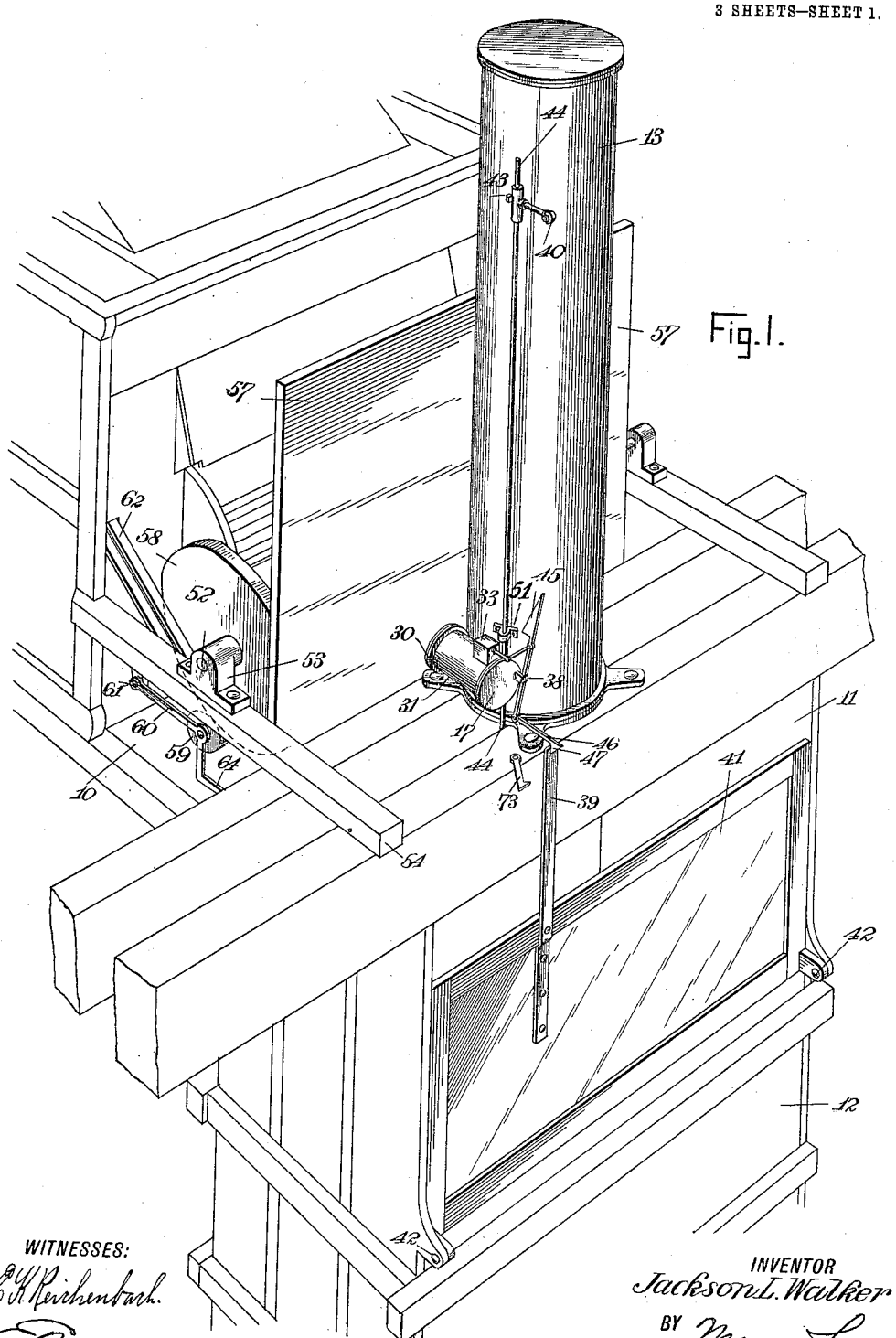

J. L. WALKER.
STEAM COTTON BALING TAMPER.
APPLICATION FILED MAR. 14, 1911.
1,075,234.
Patented Oct. 7, 1913.
3 SHEETS—SHEET 2.
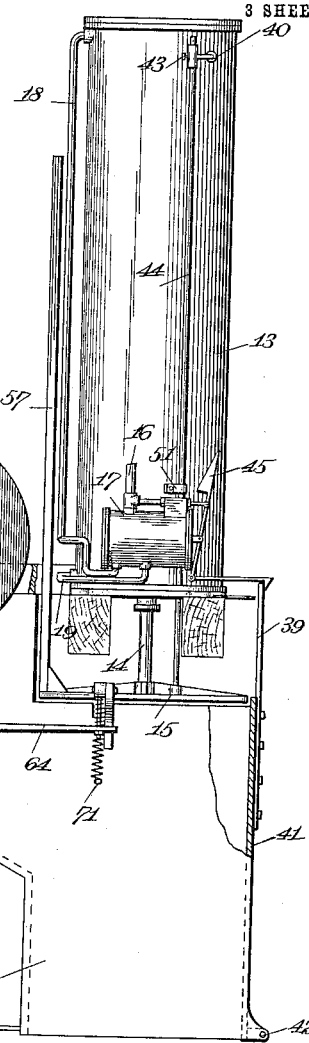
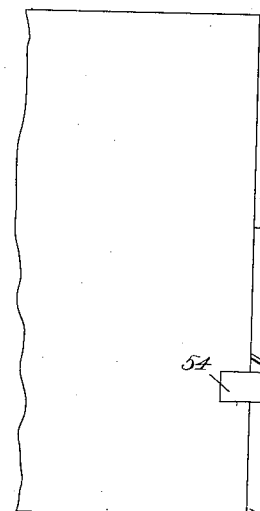
Fig. 2.
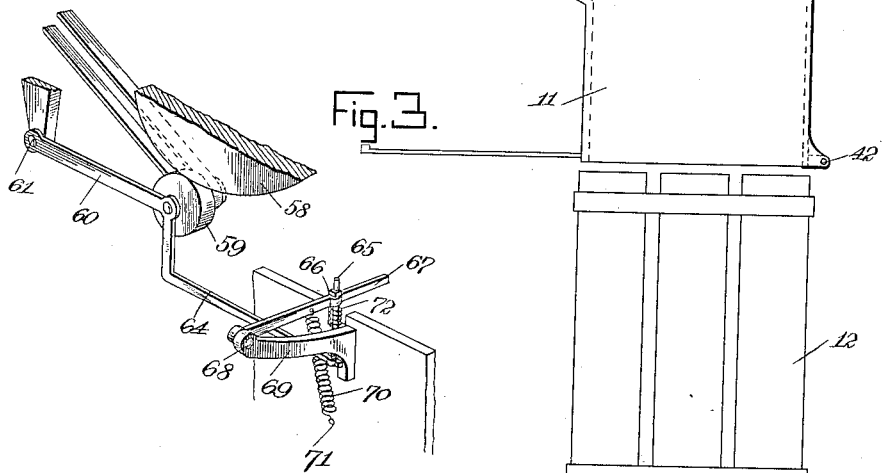
Fig. 3.
WITNESSES:
E. K. Reichenbach
C. F. Murdock
INVENTOR
Jackson L. Walker
BY Munn & Co.
ATTORNEYS
COLUMBIA PLANOGRAPH CO., WASHINGTON, D. C.

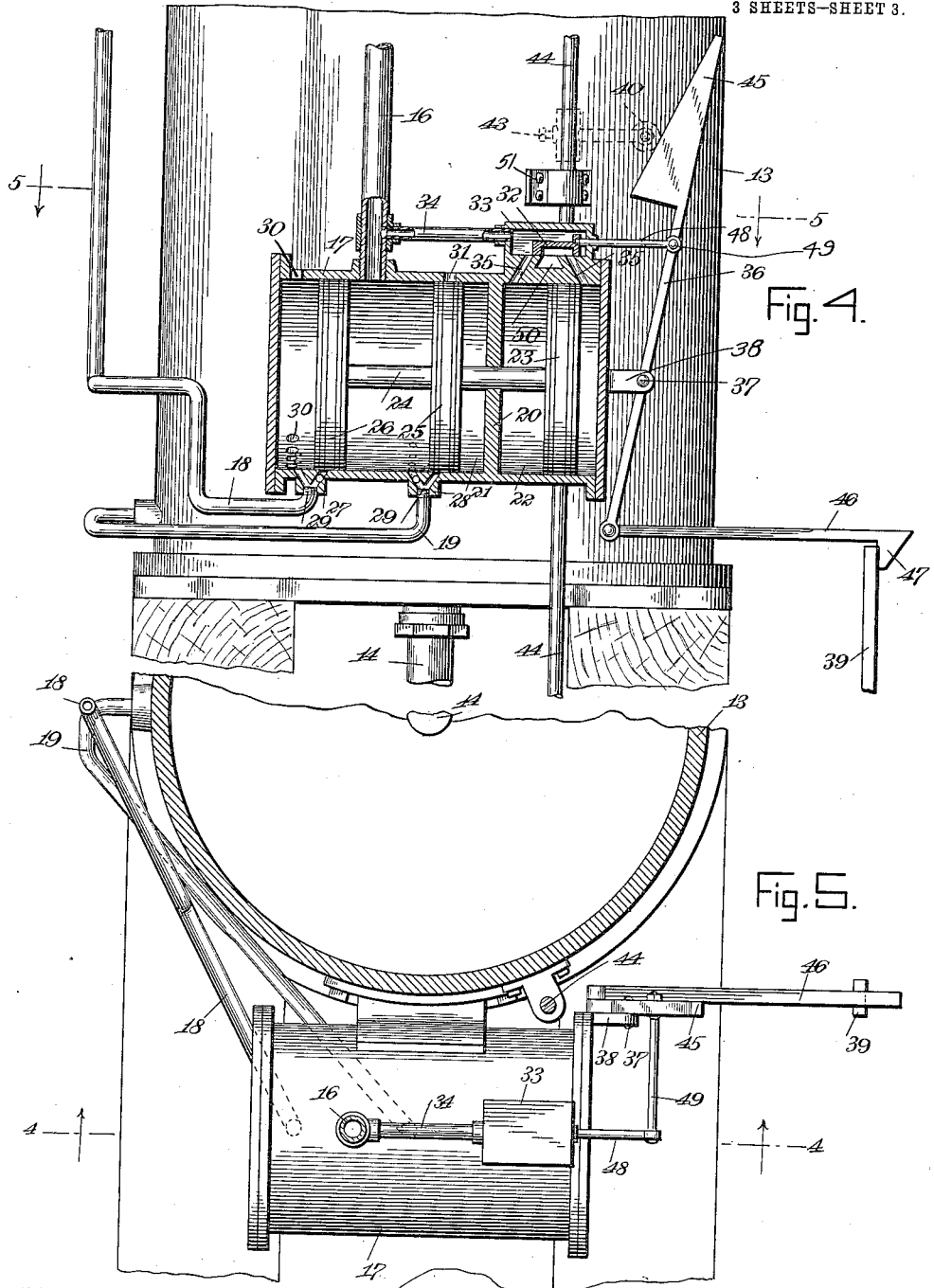

UNITED STATES PATENT OFFICE.

JACKSON LAMAR WALKER, OF CRAFTON, TEXAS.

STEAM COTTON-BALING TAMPER.

1,075,234.  Specification of Letters Patent.  Patented Oct. 7, 1913.

Application filed March 14, 1911. Serial No. 614,306.

*To all whom it may concern:*

Be it known that I, JACKSON L. WALKER, a citizen of the United States, and a resident of Crafton, in the county of Wise and State of Texas, have invented a new and Improved Steam Cotton-Baling Tamper, of which the following is a full, clear, and exact description.

Among the principal objects which the present invention has in view are: To provide a mechanism for automatically tamping or pressing into bale form cotton as delivered from the gin; to provide an operating mechanism for the tamper which is positive in its operation and automatic in its action; to provide means for suspending, during the tamping operation, the feed of cotton to the baling hopper; and to simplify and economize the construction of a mechanism of the character mentioned.

One embodiment of the present invention is disclosed in the structure illustrated in the accompanying drawings, in which like characters of reference denote corresponding parts in all the views, and in which—

Figure 1 is a perspective view of a tamper of the character mentioned, constructed and arranged in accordance with the present invention; Fig. 2 is a side view of a tamping mechanism and feeding mechanism combined, constructed and arranged in accordance with the present invention; Fig. 3 is a detail view in perspective of the transmission mechanism for operating the driving mechanism of the cotton feeders; Fig. 4 is a detail view, on an enlarged scale and in vertical section, taken on the line 4—4 in Fig. 5; Fig. 5 is a horizontal section of the tamper cylinder and operating valve therefor, taken on the line 5—5 in Fig. 4; and Fig. 6 is a detail view on an enlarged scale, showing the mechanism employed for limiting or discontinuing the steam supply to the ram cylinder.

Cotton, after passing through a gin of approved type, is passed over a tail board 10 into a hopper 11. Beneath the hopper 11 is a suitable rack 12 into which the cotton is delivered and tamped into bale form, and in which the ties forming the first or preliminary bale are placed. To move the cotton from the hopper 11, and to pack the same as tightly as convenient, a steam cylinder 13 is provided, having therein a suitable piston and a piston rod 14 connected therewith. The rod 14 is provided with a head 15, the area or face whereof is formed to dimensions substantially equal and conforming to the interior of the rack 12. Heretofore means for reciprocating the piston, piston rod and head connected therewith have been employed. The present improvements bear more intimately upon the means for actuating and controlling the reciprocation of the piston, piston rod and head.

In the present disclosure the steam, compressed air, or other suitable material is delivered by means of a pipe 16 to a valve cylinder 17. From the cylinder 17 the expansive medium is conveyed by means of a pipe 18 to the upper end of the cylinder 13 above the piston therein, and the same medium is conveyed by means of a pipe 19 to the lower end of the said cylinder and below the said piston.

As seen best in Fig. 4 of the drawings, the cylinder 17 is divided by a transverse partition 20 to form two chambers 21 and 22. Within the chamber 22 is reciprocated a piston 23. The piston 23 is fixedly mounted upon a shaft 24, slidably mounted in bearings in the partition 20, and having fixedly mounted thereon within the chamber 21 the pistons 25 and 26. The pistons 25 and 26 are spaced apart, center to center, the distance between the ends of the pipes 18 and 19 where the same enter the bosses 27 and 28. The bosses 27 and 28 are provided with V-shaped passages 29 substantially as shown. The spread of the passages 29 where the same enter the chamber 21 is not as great as the edge length of the pistons 25 and 26, it being intended that the said pistons shall cover and cut off both of the said passages 29 simultaneously when passing over same. The said passages are provided to receive steam from the chamber 21 for transmission by means of the pipes 18 and 19 to the cylinder 13, or to discharge through the chamber 21 the exhaust steam from the said cylinder to permit the same to escape through the perforations 30 and 31 respectively. The perforations 30 and 31 are extended around the entire cylinder 17 to form a ready and free egress therefrom. In Fig. 4 of the drawings the piston 25 is illustrated as covering a series of perforations 31, while in the said figure the piston 26 is withdrawn from in front of the perforations 30.

It will be seen that in the position of the parts as shown in Fig. 4 the passage 29 in the boss 28 is open to the chamber 21 with which the supply pipe 16 is in open communication. In this position the pressure of steam or other fluid being used is transmitted through the passage 29 on the left of the piston 25 through the pipe 19 to the lower end of the cylinder 13 and below the piston contained therein. In this position the pressure of steam or pressure fluid is holding the piston rod 14 and the head 15 suspended. It is obvious that the movement which would carry the piston 25 to cover the now exposed passage 29 leading from the pipe 19 would be open. In this position the passage 29 communicating with the pipe 18 at the right of the said pipe in Fig. 4 would be exposed to open communication with the chamber 21 to receive the steam or fluid therefrom to be transmitted through the pipe 18 to the upper end of the cylinder 13 above the piston contained therein, transmitting thereto the pressure of the fluid. By the same movement the passage 29 at the left of the pipe 19 would be closed while the passage at the right of the pipe 19 would be open, and to the right of the piston 25 and in communication with the perforations 31 leading to the outer air. In this position the fluid pressing down upon the piston in the cylinder 13 would void the steam or fluid from the lower end of the said cylinder 13 through the pipe 19, passage 29 exposed, and the perforations 31. These motions, so essential to the pistons 25 and 26, are produced by movement of the slide valve 32 in the valve chamber 33. The valve chamber 33 is of usual slide valve type, and is connected with the pipe 16 by a branch pipe 34. The slide valve 32 overrides the valve passages 35, being compelled thereto by means of a lever 36 which is fulcrumed at 37 on a bracket 38.

The lever 36 is rocked on the fulcrum 37 by a rod 39 and a roller 40. The rod 39 is fixedly mounted upon a yielding side 41, hingedly connected at 42, and forming the front of the hopper 11. The roller 40 is mounted by means of a set screw 43 upon a rod 44 which is fixedly mounted upon and carried by the head 15. The roller 40 extends into the path of and impinges upon a cam head 45, deflecting the same outward as shown in dotted lines in Fig. 4 of the drawings. The rod 39 is connected to the lever 36 by means of a latch rod 46, the head 47 whereof extends over the upper end of the rod 39.

When thus constructed and arranged the operation of the tamper is as follows: When the head 15 is raised, as shown in Fig. 2 of the drawings, the pistons 23, 25 and 26 are disposed as shown in Fig. 4. When in the course of operation sufficient cotton has been delivered to the hopper 11 to cause an outward pressure against the side 41, the yielding of the side 41 forces outward the rod 39, which, through the engagement by the rod 46 and the lever 36, forces the upper end of the said lever inward or to the left as seen in Fig. 4 of the drawings. The lever 36 is connected to the valve rod 48 by means of a pin 49, thereby forcing the valve 32 over the passage 35 to the left of the chamber 33. This movement of the valve 32 opens the passage 35 at the right of the chamber 33, admitting steam from the pipe 34 to the right of the piston 23, while placing the passage 35 to the left in communication with the exhaust passage 50 provided in the chamber 33. The pressure of steam now in the chamber 22 forces the piston 23 and shaft 24 connected therewith to the left. In the movement of the shaft 24 the pistons 25 and 26 are disposed to cover the passages 29, 29 extending to the left of the pipes 19 and 18 respectively, while exposing the passages 29 to the right of the said pipes. This disposition of the pistons 25 and 26 opens the communication from the pipe 19 through the chamber 21 with the perforations 31 to relieve the pressure in the pipe 19 and at the lower end of the cylinder 13. Simultaneously with the exposure of the exhaust passages for the lower end of the cylinder 13 the passage 29 leading from the chamber 21 between the pistons 25 and 26 opens the communication with the pipe 16 and the pressure supply, which, being transmitted through the pipe 18 to the upper end of the cylinder 13 forces downward the piston contained in the said cylinder 13, the piston rod 14 and head 15 connected therewith. The piston, piston rod and head referred to travel downward through the hopper 11, carrying the cotton delivered therein downward into the rack 12. In the descent of the piston, piston rod and head, the rod 44 is carried downward through a guide loop 51 mounted rigidly on the side of the cylinder 13, until the roller 40 impinges upon the inclined surface of the cam 45. The cam 45 is forced outward or to the right, as seen in Fig. 4 of the drawings, to move the valve 32 to the right of the chamber 33. The above described movement of the valve places the parts in the position shown in Fig. 4 of the drawings, where the steam from the pipe 34 being now admitted through the left passage 35 moves the piston 23, shaft 24 and pistons 25 and 26 bodily to the right until the pistons 25 and 26 open the steam passage to the pipe 19 communicating with the lower end of the cylinder 13, and open the exhaust passage 29 to communicate with the perforations 30, relieving through the pipe 18 the pressure at the upper end of the cylinder 13. This arrangement impels an upward movement of the piston in the cylinder 13 and the head 15 connected therewith. When the head 15 is disposed at the upper end of the stroke, as seen in Fig. 2 of the drawings, it remains in this position while the cotton is being fed by the feeding mechanism.

The feeding mechanism embodies a driving shaft 52. The shaft 52 is suitably mounted in bearing boxes 53 supported on suitable scantlings 54. On the shaft 52 is mounted a series of crank arms 55. To the crank arms 55 are pivotally connected a plurality of feed bars 56. The feed bars 56 bear in sliding relation upon the tail board 10, as seen best in Fig. 2 of the drawings. It will be seen that as the shaft 52 is rotated the bars 56 are caused to respectively slide up and down over the inclined tail board 10. As the cotton is delivered to the tail board 10 it is, by means of the bars 56, forced forward and downward into the hopper 11. As above stated, in course of operation the pressure produced in the hopper 11 is sufficient to force slightly outward the side 41. The movement of the side 41, as stated, initiates the descent of the head 15. The head 15 is provided with a fender board 57 fixedly mounted thereon. The board 57 is constructed to close the entrance from the tail board 10 to the hopper 11 when the head 15 is being forced downward through the hopper 11. It is to prevent the feed bars 56 operating to force the cotton against the board 57 during this part of the operation that there is provided for driving the pulley 58 a driven friction pulley 59 mounted on an arm 60 which is rocked on its pivot 61 at the beginning of the downward movement of the head 15, and which arm when so rocked removes the pulley 59 from contact with the pulley 58. The pulley 58 being fixedly mounted on the shaft 52 to drive the same the suspension of rotation of the pulley 58 results in the suspension of rotation of the shaft 52, the crank arms 55 and the feed bars 56. In this manner is effected a suspension of the feed of the cotton during the depression of the head 15 and parts connected therewith.

The pulley 59 is driven by a belt 62, the belt being connected with any suitable source of power, preferably that operating the gin to which the tamper is usually connected. The arm 60 is pivotally mounted upon a bracket 63, and is furnished with a forward extension 64. The extension 64 is yieldingly connected with a pin 65 which is adjustably secured by means of a nut 66 with a lever 67. The lever 67 is extended into the path of the head 15 and above the same, it being designed that the uplift of the head 15 shall raise the free end of the lever 67. The lever 67 is pivoted at 68 at the upper end of a bracket 69, which bracket is fixedly mounted upon the side framing of the hopper 11, as shown best in Fig. 3 of the drawings. The lever 67 is normally depressed by a spiral spring 70, which spring is anchored at 71 on the side of the hopper and is connected with the lever 67, as shown in Fig. 3. The pull of the spring 70 depresses the lever 67 and therewith the pin 65, the extension 64, the arm 60 and pulley 59, carrying the latter from contact with the pulley 58. A spring 72 connects the end of the extension 64 and the lever 67 in such manner that the lift of the lever 67 forces the pulley 59 into contact with the pulley 58 through the spring 72, thereby avoiding breakage of the arm 60 or parts connected therewith. When the head 15 is removed from under the lever 67 and the spring 70 pulls the same down, the arm 60 and parts connected therewith rest upon the lever 67 by means of the nut 66.

It will now be observed that in the complete operation of the machine the feeding mechanism above described operates intermittently with the tamping mechanism, the cotton being fed to the hopper 11 during the interim in the operation of the tamper when the head 15 is raised above the tail board 10; that in the operation of the feeder when the hopper 11 is filled a pressure is produced on the side 41 to force outward the said side and to inaugurate the operation of the tamper to force downward the head 15; that with the head 15 descending the lever 67 descends, removing thereby the driving engagement between the pulleys 59 and 58 to suspend the operation of the feeding mechanism; that the head 15, continuing to descend, presses the cotton from the hopper 11 into the rack 12 with finally the full force of the expansive medium used for operating the piston within the cylinder 13; that with the descent of the head 15 the fender board 57 cuts off the feed of the loose cotton on the tail board 10 to prevent the same passing into the hopper to the upper side of the head 15; that at the lower end of the stroke of the piston connected with the piston rod 14 and head 15, the cam 45 and parts connected therewith are moved to change the valve 32 in the chamber 33 and thereby inaugurate the lift of the head 15 out of the rack 12 and hopper 11, and to the position shown in Fig. 2 of the drawings; that at the end of the upward stroke, just prior to arriving at the position of rest shown in Fig. 2, the head 15 strikes under the lever 67 to lift the same, and therewith the arm 60, to cause driving contact between the pulleys 59 and 58; that with the resumption of contact between the pulleys 59 and 58 the operation of the feeding mechanism is resumed; and that when in course of tamping the operation of the feeding mechanism being thus resumed the pressure in the hopper 11 again moves the side 41, and the above described operation of the tamper is repeated.

If at any time it is desired to prevent the operation in the manner as above described of the tamping mechanism, this is accomplished by throwing the latch 73 to engage the rod 39. This would prevent the side 41 being moved outward and the shift of the valve 32.

As shown in Fig. 6 of drawings, the supply of steam to the pipes 18 and 19 is controlled by a screw-pin 74, which is manipulated in the bosses 27 and 28 across the inlet perforations from the cylinder 17 to the pipes 18 and 19. It will be understood that, while I employ the screw-pin 74 as a convenient device, I am not limited to such employment, there being many obvious substitutions for said pin.

Having thus described my invention, what I claim as new and desire to secure by Letters Patent is:—

1. In a cotton baling tamper, a hopper having a yielding member, a pressure cylinder, a piston in the cylinder and carrying a presser head, means including a slide valve for controlling the admission of a motive agent to the pressure cylinder, a pivoted lever with which the slide valve is connected, means for pivotally connecting the lever with the yielding member of the hopper, a member carried by the presser head, and means for operating the lever from the member of the presser head.

2. In a cotton baling tamper, a hopper having a yielding member, a pressure cylinder, a piston in the cylinder and carrying a presser head, means including a slide valve for controlling the admission of a motive agent to the pressure cylinder, a pivoted lever having a cam at one end and connected at its other end with the yielding member of the hopper, a pivoted connection between the lever and slide valve, a member carried by the presser head, and a roller carried by the member of the presser head and adapted to engage the cam of the said lever.

3. In a cotton baling tamper, a hopper having a yielding member provided with a rod, a pressure cylinder, a piston in the cylinder and carrying a presser head, means including a slide valve for controlling the admission of a motive agent to the pressure cylinder, a pivoted lever having a cam head at one end and connected with the slide valve, a catch pivoted to the other end of the lever and engaging the rod of the yielding member, a rod carried by the presser head, and a roller carried by the said rod and adapted to engage the cam head of the lever.

4. In a cotton baling tamper, a hopper, a reciprocating presser head, a feeding mechanism embodying a crank shaft and reciprocating push arms connected therewith, a driving mechanism operatively connected with the crank shaft through a driven pulley, a pivoted lever pivoted at one end in which the pulley is mounted intermediate of the ends of said lever, a pivoted and spring pressed lever having its free end extending in the path of the presser head, and a yielding connection between the said levers.

5. In a cotton baling tamper, a hopper, a reciprocating presser head, a crank shaft, push arms mounted on the crank shaft, a pulley on said crank shaft, a pivoted lever, pivoted to the hopper and a driven pulley mounted in the lever intermediate of the ends thereof and adapted to engage the pulley of the crank shaft, a pivoted and spring pressed lever mounted on the hopper at right angles to the first lever and having its free end extending in the path of the presser head, a pin connecting the free end of the lever carrying the pulley with the other lever, and a spring on the pin between the levers.

In testimony whereof I have signed my name to this specification in the presence of two subscribing witnesses.

JACKSON LAMAR WALKER.

Witnesses:
GUS HENDERSON,
W. M. CHIPMAN.

---

Copies of this patent may be obtained for five cents each, by addressing the "Commissioner of Patents, Washington, D. C."